(12) United States Patent
Brown

(10) Patent No.: US 7,677,830 B1
(45) Date of Patent: Mar. 16, 2010

(54) FURNITURE JOINERY

(76) Inventor: Michael T. Brown, P.O. Box 459, Shelbyville, KY (US) 40066

( * ) Notice: Subject to any disclaimer, the term of this patent is extended or adjusted under 35 U.S.C. 154(b) by 0 days.

(21) Appl. No.: 11/697,329

(22) Filed: Apr. 6, 2007

(51) Int. Cl.
*A47B 13/04* (2006.01)
*F16B 12/46* (2006.01)
(52) U.S. Cl. .................. 403/381; 403/231; 403/295; 403/382; 403/403; 312/140
(58) Field of Classification Search .............. 403/170, 403/217, 219, 230, 231, 295, 381, 382, 401, 403/403; 248/188, 188.91; 312/140, 263, 312/264
See application file for complete search history.

(56) References Cited

U.S. PATENT DOCUMENTS

| 110,013 | A | 12/1870 | Cougle |
| 136,837 | A | 3/1873 | Jefts |
| 194,903 | A | 8/1877 | Hass |
| 242,513 | A | 6/1881 | Crane |
| 422,843 | A | 3/1890 | Smith |
| 456,377 | A | 7/1891 | Goedeke |
| 473,151 | A | 4/1892 | Good et al. |
| 478,857 | A | 7/1892 | Harman et al. |
| 480,536 | A | 8/1892 | Welker |
| 495,857 | A | 4/1893 | Volz |
| 509,618 | A | 11/1893 | Goodyear |
| 512,992 | A | 1/1894 | Ritchey |
| 533,766 | A | 2/1895 | Williams |
| 545,538 | A | 9/1895 | Sellers |
| 556,869 | A | 3/1896 | Singler |
| 562,133 | A | 6/1896 | Grassler |
| 577,229 | A | 2/1897 | Bosch |
| 636,434 | A | 3/1899 | Kendall |
| 626,554 | A | 6/1899 | McLean |
| 637,506 | A | 11/1899 | Fries |
| 677,726 | A | 7/1901 | Welker, Sr. |
| 766,695 | A | 8/1904 | Herzog |
| 836,585 | A | 11/1906 | Koeser |
| 1,181,156 | A | 5/1916 | Neal |
| 1,184,297 | A * | 5/1916 | Balbach ................ 248/188 |
| 1,214,261 | A | 1/1917 | Balbach |
| 1,246,714 | A | 11/1917 | Carlson |
| 1,306,452 | A | 6/1919 | White |
| 1,338,202 | A | 4/1920 | White |
| 1,389,008 | A | 8/1921 | Pohle, Jr. |
| 1,422,770 | A | 7/1922 | Kropf |
| 1,480,905 | A | 1/1924 | Hebert |
| 1,525,630 | A | 2/1925 | Wendl |
| 1,526,009 | A | 2/1925 | Partington |
| 1,558,618 | A | 10/1925 | Jasper |
| 1,630,521 | A | 5/1927 | Bolin |

(Continued)

FOREIGN PATENT DOCUMENTS

EP 671566 A1 * 9/1995

(Continued)

*Primary Examiner*—Victor MacArthur
*Assistant Examiner*—Ernesto Garcia
(74) *Attorney, Agent, or Firm*—James Cole; Middleton Reutlinger

(57) ABSTRACT

A furniture joinery comprises a slide rail having a plurality of grooves, at least one slide block slidably disposed in the slide rail, the slide block having a plurality of slides for engaging the slide rail, at least one of the plurality of slides having a neck and a head, the grooves receiving the neck therein.

13 Claims, 14 Drawing Sheets

U.S. PATENT DOCUMENTS

| | | | |
|---|---|---|---|
| 1,644,336 A | 10/1927 | Gunlocke et al. | |
| 1,770,772 A | 7/1930 | Wright | |
| 1,778,135 A | 10/1930 | Williams | |
| 1,787,598 A | 1/1931 | Smith | |
| 1,834,313 A | 12/1931 | Kaufman | |
| 1,843,369 A | 2/1932 | Olsen | |
| 1,863,995 A * | 6/1932 | Ponstingl | 403/295 |
| 1,876,336 A | 9/1932 | McLaughlin | |
| 1,942,003 A | 1/1934 | Rundle | |
| 1,989,955 A | 2/1935 | Patter | |
| 2,077,067 A * | 4/1937 | McLellan et al. | 403/219 |
| 2,116,584 A | 5/1938 | Shelby | |
| 2,143,542 A | 1/1939 | Clarin | |
| 2,169,139 A | 8/1939 | Foote | |
| 2,304,481 A | 12/1942 | Shannon | |
| 2,371,329 A | 3/1945 | Hirsch | |
| 2,395,673 A | 2/1946 | Krantz | |
| 2,485,784 A | 10/1949 | Shoenberg | |
| 2,520,231 A | 8/1950 | Anderson | |
| 2,522,827 A | 9/1950 | Kelly | |
| 2,552,286 A | 5/1951 | Kompass | |
| 2,580,707 A * | 1/1952 | Underhill | |
| 2,588,818 A | 3/1952 | Franks | |
| 2,603,545 A | 7/1952 | Haven | |
| 2,651,355 A | 9/1953 | Lucas | |
| 2,709,485 A | 5/1955 | Haven | |
| 2,970,025 A | 1/1961 | Wilson | |
| 3,090,086 A | 5/1963 | Fata | |
| 3,204,905 A | 9/1965 | Marban | |
| 3,399,912 A | 9/1968 | Maspero | |
| 3,664,011 A | 5/1972 | Labastrou | |
| 3,669,479 A | 6/1972 | Payne | |
| 3,674,068 A | 7/1972 | Lucci | |
| 3,899,258 A | 8/1975 | Matthews | |
| 3,957,239 A | 5/1976 | Slaats et al. | |
| 3,991,535 A | 11/1976 | Keller et al. | |
| 4,032,242 A | 6/1977 | Morris | |
| 4,057,356 A | 11/1977 | Nissen | |
| 4,072,433 A * | 2/1978 | Veyhl | 403/172 |
| 4,138,094 A | 2/1979 | Thir | |
| 4,161,977 A | 7/1979 | Baslow | |
| 4,168,922 A | 9/1979 | Worrallo | |
| 4,300,455 A | 11/1981 | Ornati | |
| 4,396,173 A | 8/1983 | Call, Sr. | |
| 4,432,590 A * | 2/1984 | Lawrence et al. | 403/231 |
| 4,586,310 A | 5/1986 | Baril et al. | |
| 4,691,965 A * | 9/1987 | Hsiung | 403/176 |
| 4,766,821 A | 8/1988 | Pauer et al. | |
| 4,918,871 A | 4/1990 | Widmann | |
| 4,973,187 A | 11/1990 | Sauder | |
| 5,042,615 A | 8/1991 | Anderson | |
| 5,116,161 A | 5/1992 | Faisst | |
| 5,499,886 A | 3/1996 | Short et al. | |
| 5,577,451 A | 11/1996 | Yeh | |
| 5,746,325 A * | 5/1998 | Lee | 403/381 |
| 5,803,561 A * | 9/1998 | Puehlhorn | |
| 5,820,089 A | 10/1998 | Lim | |
| 6,017,092 A | 1/2000 | Lee | |
| 6,179,515 B1 * | 1/2001 | Grieser et al. | 403/381 |
| 6,397,551 B1 * | 6/2002 | Lewcock et al. | 403/170 |
| 6,413,007 B1 | 7/2002 | Lambright | |
| 6,481,177 B1 | 11/2002 | Wood | |
| 6,579,033 B2 * | 6/2003 | Ajiki | 403/381 |
| 6,691,537 B2 | 2/2004 | Tan | |
| 2006/0162277 A1 | 7/2006 | Schultz | |

FOREIGN PATENT DOCUMENTS

| | | | |
|---|---|---|---|
| EP | 1081393 A1 * | 3/2001 | |
| FR | 2515014 A * | 4/1983 | |
| SE | 35656 * | 8/1912 | |

* cited by examiner

FURNITURE JOINERY

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates to furniture joinery and more particularly to slide rail and slide block constructions for joining furniture components.

2. Description of the Related Art

Furniture joinery is a term which generally refers to one or more elements structures used to join two or more components of a piece of furniture. As furniture manufacturing has evolved, the desire for knock-down furniture which may be manufactured in one location and shipped for assembly to another location has increased. Prior art joinery, sometimes utilizes dovetail construction which has various deficiencies. First, the dovetails are difficult to manufacture which results in higher costs being passed to the consumer. The dovetail design also has a weakened area where the dovetail extends from the workpiece. Such area is typically referred to as a neck and receives the majority of the stress created at the joint. Other prior art joinery may utilize a metal brace to join parts. However, these metal to wood connections must have multiple screws to create a lasting rigid joint. Further, chair rails and table aprons often require multiple screws or bolts at each corner of a furniture piece and/or clamps to insure furniture components are tight while glue dries. For example one screw may pass through a joinery element into a leg while other screws may extend into adjacent apron structures in order to tie all of the pieces together rigidly. The use of multiple fasteners or clamping mechanisms results in higher manufacturing costs and increased parts and labor to accomplish a desired task.

Another problem with some knock-down furniture designs is related to shipping. It is desirable to utilizing the least amount of volume in shipping. Where some designs for furniture joinery have required larger portions of a furniture piece to be assembled prior to shipping, the larger partial assemblies result in higher shipping costs where larger assemblies can not be nested within other structures being shipped. It is desirable that a furniture joinery be developed which decreases the number of fasteners required for ease of assembly and which also may be easily shipped from a collapsed configuration minimizing volume from a manufacturing facility to an assembly facility or a consumer.

Given the foregoing, it will be appreciated that a joinery assembly is desired which may be used with various types of furniture pieces and which allows for easy assembly of such pieces.

SUMMARY OF THE INVENTION

A furniture joinery comprises a slide rail having a plurality of grooves, at least one slide block slidably disposed in the slide rail, the slide block having a plurality of slides for engaging the slide rail, at least one of the plurality of slides having a neck and a head, the grooves receiving the neck therein. The slide block has three slides. The upper and lower slides each have the neck and the head. The slide rails further comprising an undercut channel disposed beneath at least one of said plurality of slides. The undercut channels are disposed beneath two of the grooves. The undercut channel receives the head. The plurality of slides have a substantially T-shaped cross-section. The plurality of grooves and undercut channels in combination forming a substantially T-shaped cross-section. The furniture joinery further comprises at least one fastener aperture extending through the slide block. A first fastener aperture extends through the slide block and a second fastener aperture extending through the slide block in an orientation substantially perpendicular to the first fastener aperture.

A furniture joinery for a furniture piece comprises a first pair of legs and a second pair of legs, a first slide rail disposed between the first pair of legs, a second slide rail disposed between the second pair of legs, first and second side slides rails, each of said side slide rails disposed between one of said first pair of legs and one of said second pair of legs, the slide rails each having a plurality of grooves for receiving a slide block, the slide rails having a plurality of grooves, at least one of the grooves having an undercut channel defining a substantially T-shaped cross section in said slide rail, the slide block having slides which slidably engage the slide rails, the slides having a substantially T-shaped cross section. At least one of the slide rails further comprising a slot extending substantially perpendicular to the plurality of grooves. The slot extending through at least one of the upper and lower surfaces of the slide rail. The furniture joinery further comprises an insert disposed within the slot, the slide block engaging the insert. The furniture slide block has at least one fastening aperture for connecting the slide block to one of the first pair and second pair of legs. The furniture joinery the slide block may have an aperture for connecting a structural element above the slide block. The furniture joinery the grooves of at least one of the slide rails extending from a first end to a second end of at least one of the first and second side slide rails. The grooves of at least one of the slide rails having a widened central portion for receiving the slide block.

A furniture joinery assembly comprises a slide rail having a plurality of grooves, at least one slide block slidably disposed in the slide rail, the slide block having a plurality of slides for engaging the slide rail, at least one of the plurality of slides having a neck and a head, the grooves receiving the neck therein, and, a slot extending perpendicular to the plurality of grooves near ends of the slide rail. The plurality of grooves extend from a first end to a second end of the slide rail. The grooves further comprise an undercut channel. The grooves and the undercut channel define a substantially T-shaped cross-section. The furniture joinery further comprises an insert disposed in the slot. The furniture joinery further comprises two slide rails and one slide block at each corner of a furniture piece wherein the slide block engages the insert.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
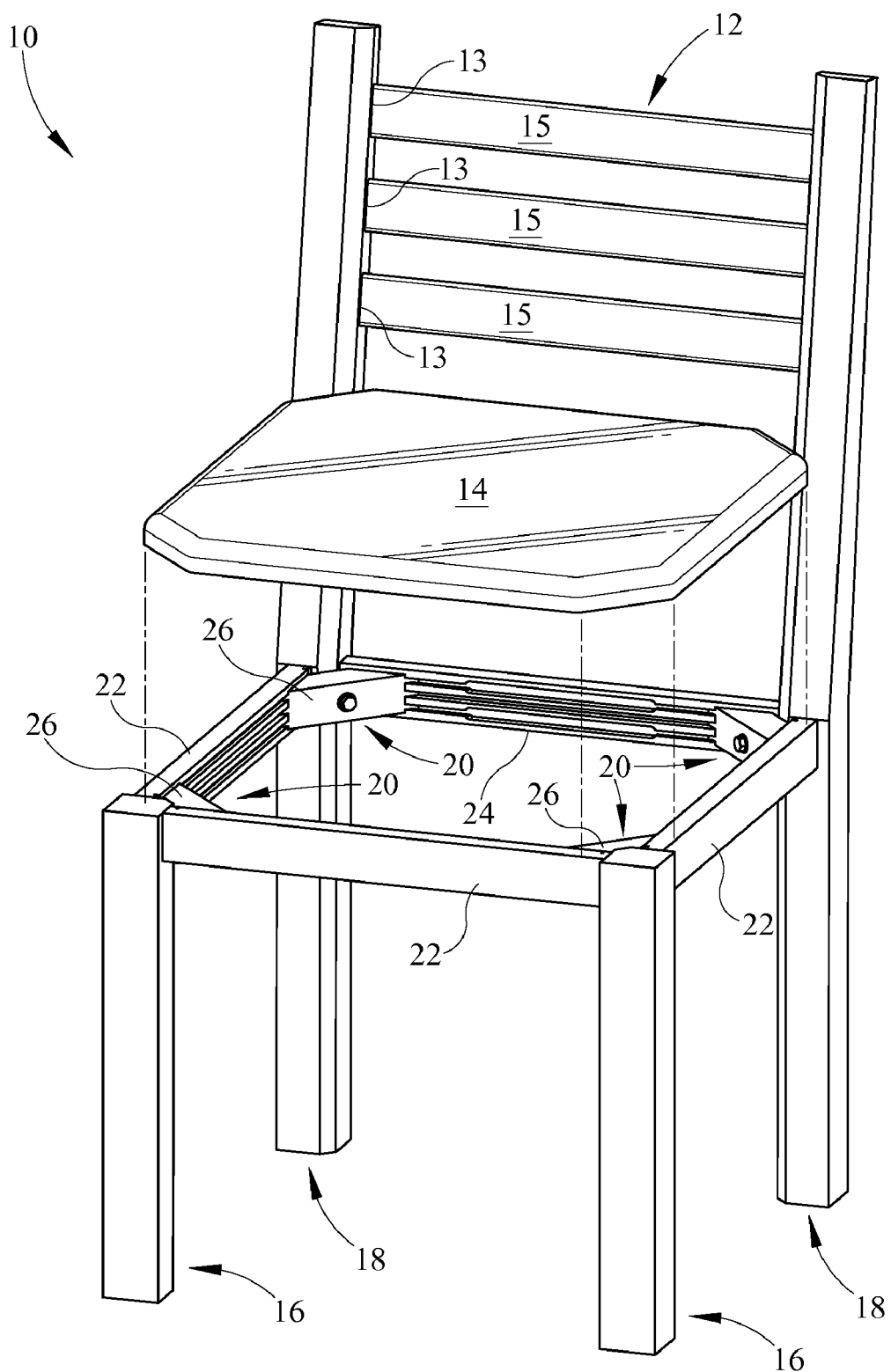
FIG. 1 depicts a partially exploded perspective view of a chair utilizing furniture joinery.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring initially to FIG. 1, a chair 10 is depicted. The chair 10 is merely an exemplary embodiment and therefore the scope of the present description should not be unnecessarily limited to the specific chair 10 design depicted herein. The chair 10 comprises a chair back 12 extending upwardly behind a seat portion 14 such that the seat 14 supports the weight of the user and the chair back 12 supports the back of the user. The seat 14 is supported by a plurality of legs. According to the exemplary embodiment, the chair 10 comprises two front legs 16 and two rear legs 18. The front legs 16 extend from a substrate to the lower surface of the seat 14 providing support for the seat 14. The rear legs 18 extend upwardly from the substrate to above the seat 14 in order to define a portion of the chair back 12. The legs 16, 18 are held together by joinery 20, defined by a plurality of grooved slide rails 22 extending between the front legs 16 and the rear legs 18 and between the front legs 16. The joinery 20 is also defined by a rear slide rail 24 extending between the two rear legs 18. The joinery 20 is also defined in part by a slide block 26. As the slide block 26 is tightened into position, the legs 16, 18 and the grooved rails 22 tighten together providing a firm base for the seat 14 and the chair 10 as well as a strong triangular support shape joining furniture components. It should be understood that the chair 10 may further comprise structural components extending between the legs 16, 18 parallel to the rails 22, 24 but in a position closer to the floor for added structural support.

Figure 2:
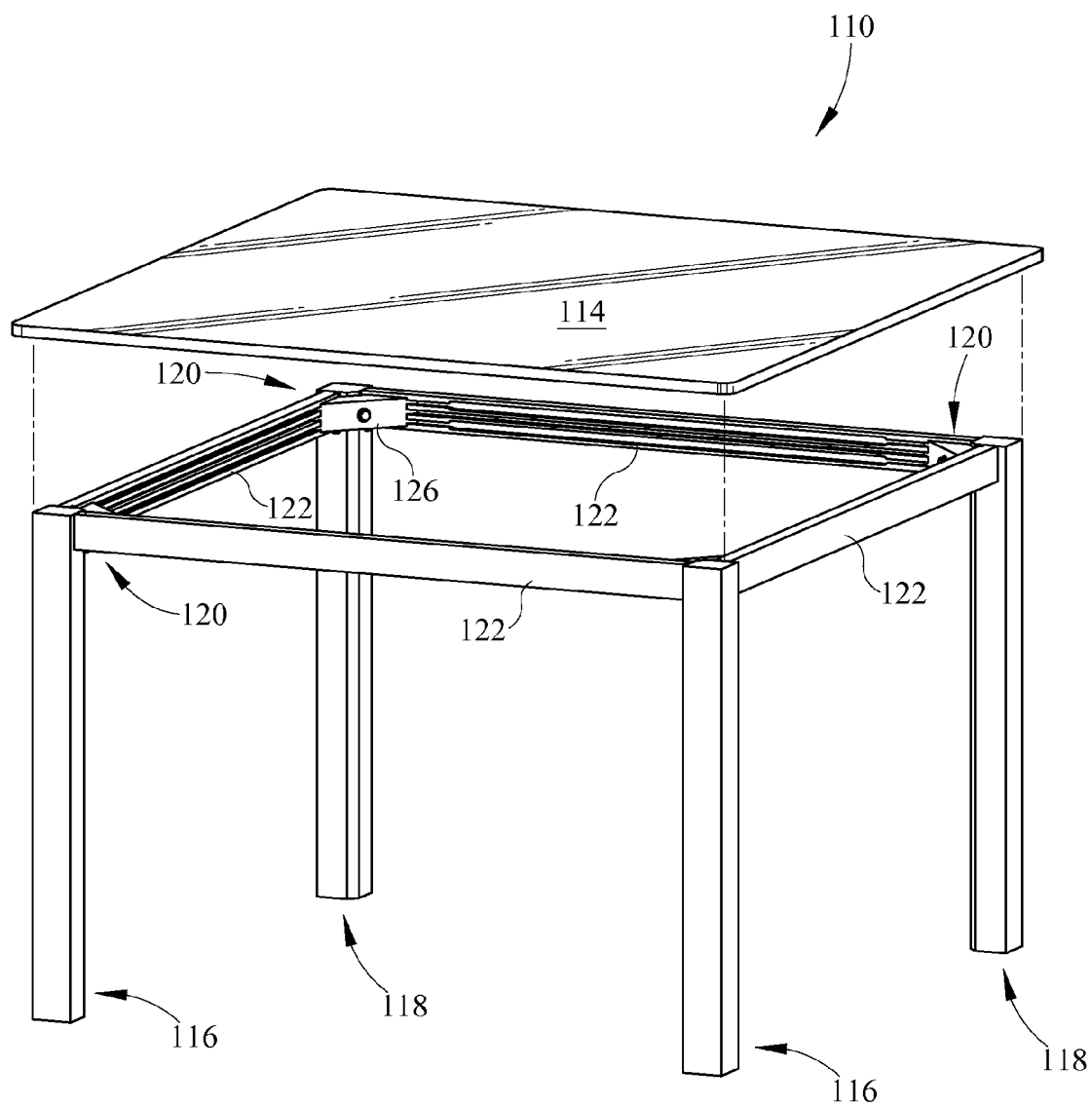
FIG. 2 depicts a partially exploded perspective view of a table utilizing furniture joinery.

Referring to FIG. 2, an alternative embodiment is depicted utilizing joinery 120. A table 110 is depicted having an upper surface 114. The table surface 114 is supported by first and second front legs 116 and first and second rear legs 118 which are connected by a plurality of table aprons 122 corresponding to the grooved slide rails 22. The joinery 120 is defined by the table aprons 122 and a plurality of slide blocks 126, which join the aprons 122 and the legs 116, 118. It should be understood by one skilled in the art that the joinery 120, therefore, should not be limited to a chair construction but may also be utilized in a table or various other furniture structures requiring joining of structural components. Accordingly, the description herein should not be limited to the specific uses specifically shown and described, but instead should be considered more broadly for use in joining various furniture components.

Figure 3:
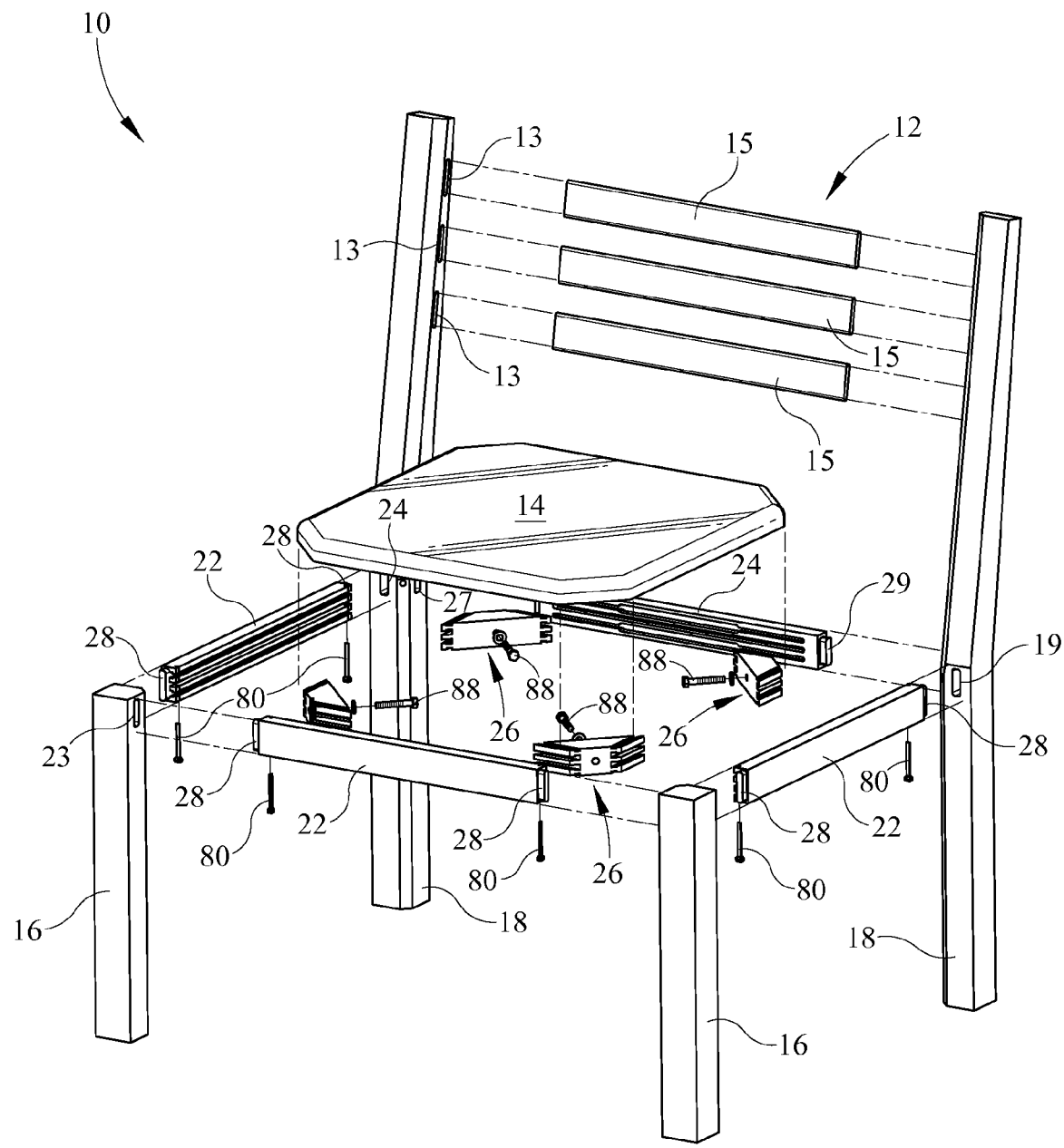
FIG. 3 depicts an exploded perspective view of the chair of FIG. 1.

Referring now to FIG. 3, the chair 10 of the FIG. 1 embodiment is depicted in an exploded perspective view. The chair back 12 is formed of the rear legs 18 which extend above the seat 14. The upper portions of the rear legs 18 comprise a plurality of aligned apertures 13. The apertures 13 receive a corresponding number of slats 15 aligned to fit within the apertures 13 and extend between the rear legs 18. Alternatively, the chair back 12 may include a plurality of alternative structures such as a one-piece construction extending from the seat 14, or which extend between or are connected to the rear legs 18 so as to provide a support for a person sitting in the chair 10. For example, the chair back 12 may include padding and may be covered in a fabric or the chair back 12 may include a weaved material, such as wicker or the like, extending between the upper portions of the rear legs 18. Therefore, the chair back 12 should not be limited to the specific construction depicted and described herein.

The front legs 16 each have a surface facing an opposed surface of the rear leg 18. Extending between the front legs 16 and rear legs 18 are side grooved slide rails 22. The opposed surface of the front leg 16 (not shown) and the rear leg 18 each include a keyway 24 which receives a key 28, which alternatively may be a mortise and tenon, dowel and aperture or other male-female assembly of interconnecting parts known to one skilled in the art. During construction, the key 28 is inserted into the keyway 24 to loosely connect the grooved rails 22, the front legs 16, and the rear leg 18. A manufacturer may utilize glue on the key 28/keyway 19 to aid construction, if so desired.

Extending between the pair of front legs 16 is a third grooved rail 22. Each of the front legs 16 includes an opposed surface having an aperture 23 for receiving the key 28 of the grooved rail 22. Thus, the front grooved rail 22 connects the pair of front legs 16 loosely. Referring now to the rear legs 18, each of the rear legs 18 includes an opposed surface having an aperture 27. A rear grooved rail 24 extends between the parallel rear legs 18 such that the keyways 27 receive keys 29 extending from ends of the rear slide rail 24. As previously described, the key/keyway combination may alternatively be a mortise and tenon, dowel and aperture or other male-female assembly of interconnecting parts known to one skilled in the art. According to one alternative, the grooved rear slide rail 24 may be formed integrally with a seat back structure 12, or with the seat 14. With this description, one skilled in the art will understand that the front legs 16 are connected by a rail 22, the rear legs 18 are connected by a rail 24 and the front and rear legs are connected on each side of the chair 10 by the grooved rails 22. This construction provides stability in four directions, front to back, between the front legs 16 and rear legs 18 and side to side between the front pair of legs 16 and between the rear pair of legs 18.

Figure 4:
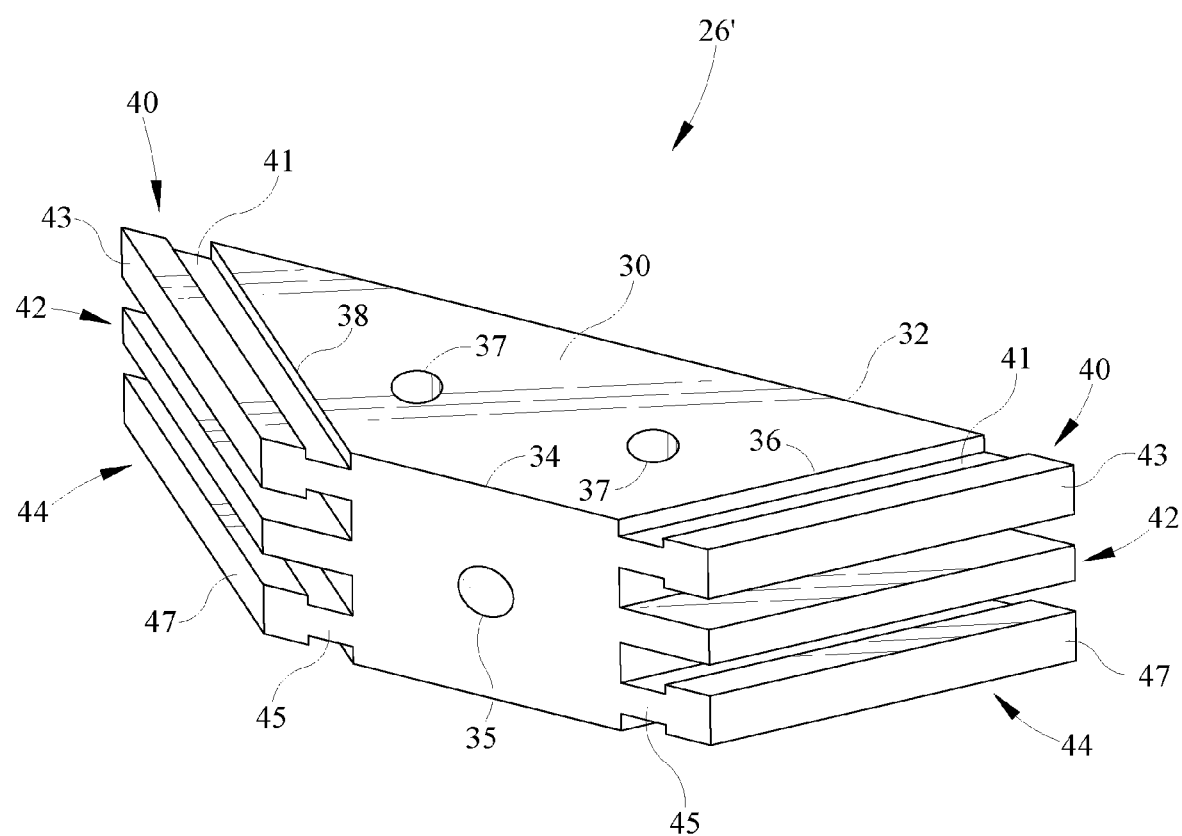
FIG. 4 depicts a perspective view of a slide block.

The joinery 20 further comprises slide blocks 26 as previously described, which connect the grooved rails 22 to one another, to the rail 24, and which may be tightened against the front legs 16 and the rear legs 18 at each corner of the chair 10. Although the joinery 20 described herein is described with respect to the chair 10, it should be clear that the description should not be limited to such a chair but may also be utilized with the table 110 or other pieces of furniture having joined sides or legs which could benefit from the construction of the joinery and equivalent structures. Referring now to FIG. 4, an alternative slide block 26' is depicted in perspective view. The slide block 26' is generally shaped as a frusto-triangularly shaped trapezoid. The block 26' may be alternately shaped however, and therefore should not be limited to the trapezoidal shape shown. The slide block 26' comprises a body 30, having first and second parallel sides 32, 34. The shorter parallel side 34 is positioned against the legs 16, 18. Extending through the body 30 from the short side 34 to long side 32 is fastener aperture 35. Likewise, the body 30 may also comprise one or more vertically oriented apertures 37 for fastening the block 26' to the seat 14 or a table top. The difference between slide blocks 26 and 26' is merely the vertically oriented apertures 37 and therefore these parts are interchangeable. Extending along the non-parallel sides 36, 38 of the body 30 are a plurality of slides. For example, along side 36 of the body 30 is an upper slide 40, a middle slide 42 and a lower slide 44. Likewise, along the angled side 38 is an upper slide 40, middle slide 42 and a lower slide 44. By utilizing three slides, any force carried at a joint is spread across three parts, rather than a single weak point of a dovetail joint. The upper slides 40 comprise an upper neck 41 and an upper head 43 at an end of the upper neck 41 distal from the side 36. The head 43 is generally square in shape and extends along the entire length of the upper neck 41. Likewise, the lower slide 44 comprises a lower neck 45 and a lower head 47 distal from the side 36. Also extending from the side 36 and disposed between the upper slide 40 and lower slide 44 is a middle slide 42. The middle slide 42 does not comprise a distal rib as the upper and lower fingers, however a middle rib may be utilized and therefore should be understood to be within the scope of the present invention. The side 38 comprises the same upper, lower and middle slides in the same orientation as previously described. The sides 36, 38 are angled at about 45 degrees to the long side 32 of the body 30. However, these angles may vary depending on the arrangement of the components being joined by the rails 22.

Figure 5:
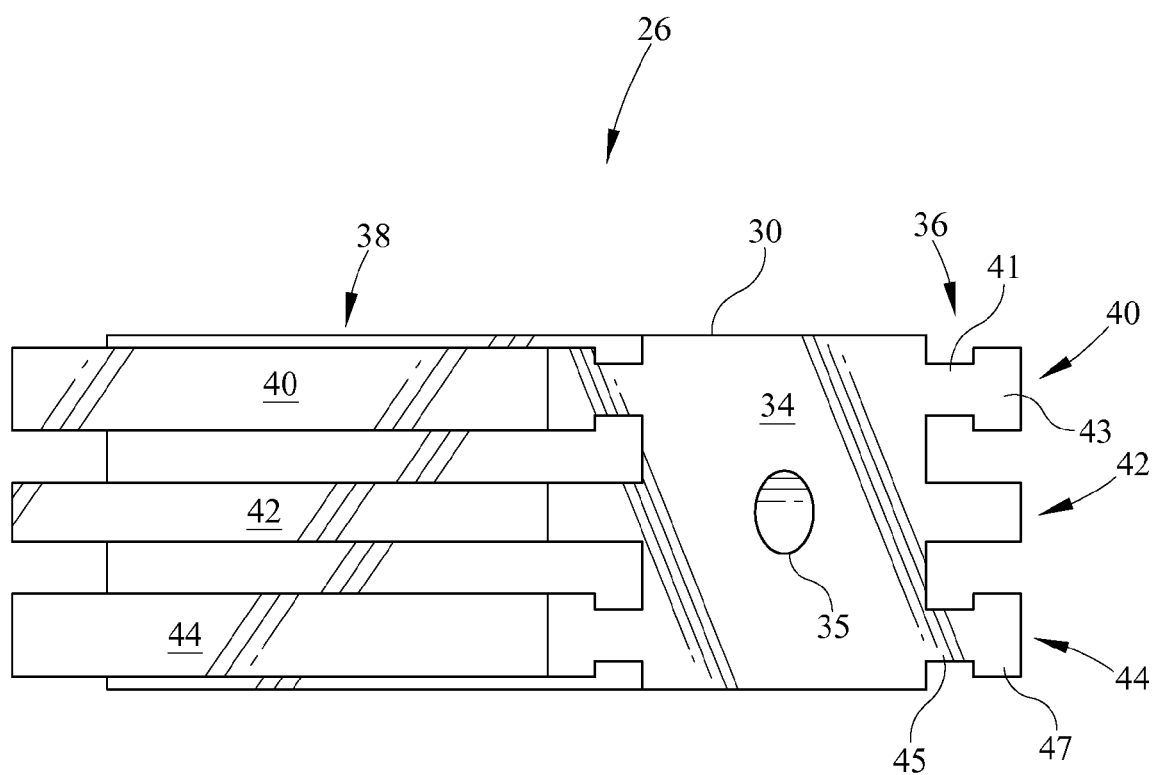
FIG. 5 depicts a side view of the slide block of FIG. 4.

Referring now to FIG. 5, a side perspective view of the slide block 26 depicts an end view of side 36 and the slides associated therewith. The upper slide 40 comprises a neck 41 having a thickness in a vertical dimension which is less than the thickness of the head 43 in the vertical dimension. Accordingly, the upper slide 40 is generally T-shaped when viewed from the end shown in FIG. 5. Likewise, the lower slide 44 comprises a neck 45 having a thickness in a vertical dimension which is less than the thickness in the vertical dimension of the head 47. Accordingly, the finger 44 is generally T-shaped and extends parallel to the upper slide 40. The middle slide 42 has a thickness in a vertical dimension which is generally equivalent to the upper and lower necks 41, 45. The necks and heads of the upper and lower slides 40,44 may be integrally formed or may be separately formed and joined by fastener, fixative or both. The middle slide 42 fails to comprise a head as the upper slide 40 and lower slide 44, although a head may be utilized and may be within the scope of the present invention. The upper slide 40 has a horizontal dimension which is equivalent to the lower slide 44 and the middle slide 42. Accordingly, each of the slides extends an equivalent distance from the side 36. These characteristics are repeated in the slides extending from side 38 and therefore will not be described.

Figure 6:
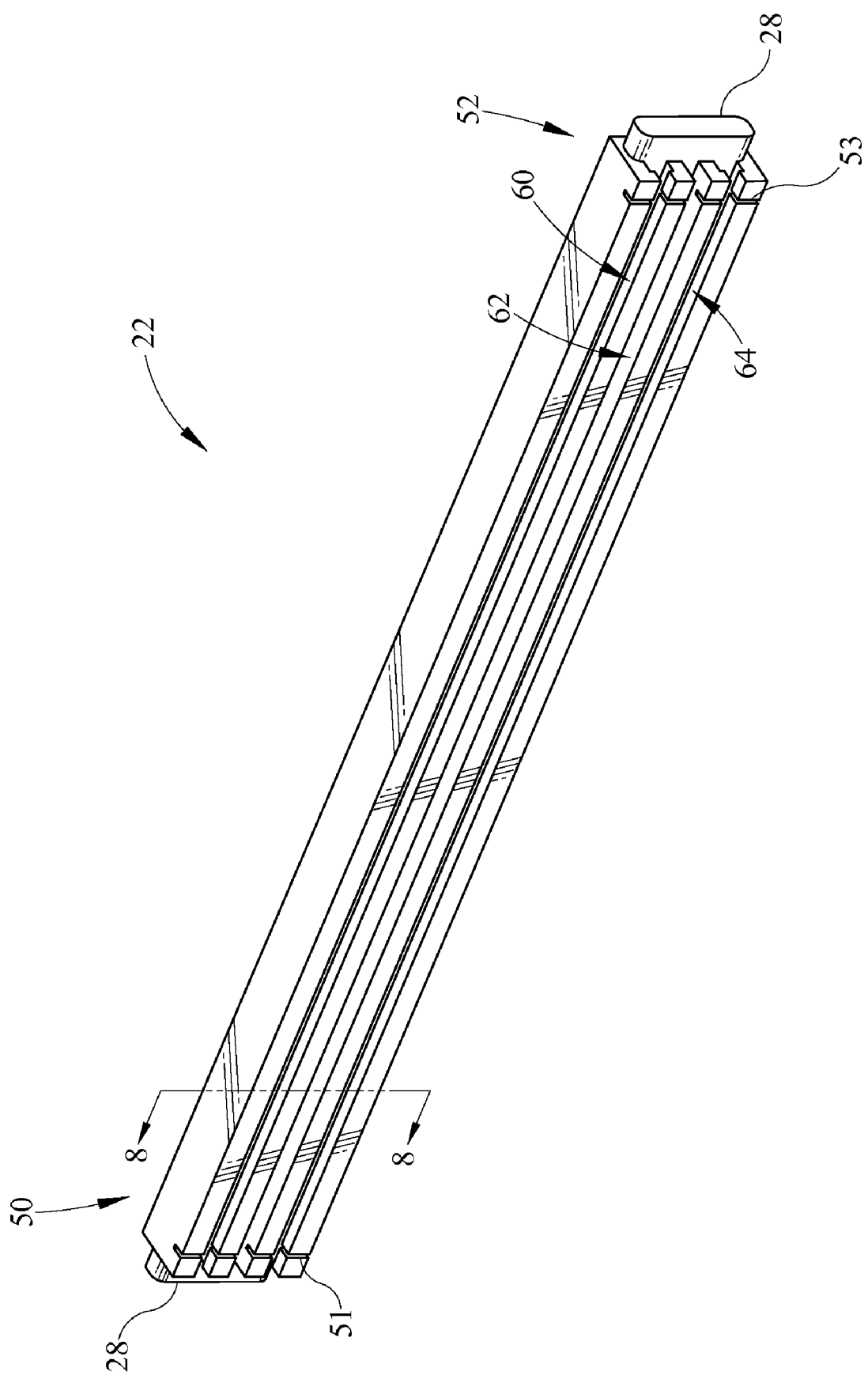
FIG. 6 depicts a perspective view of a slide rail.
Figure 8:
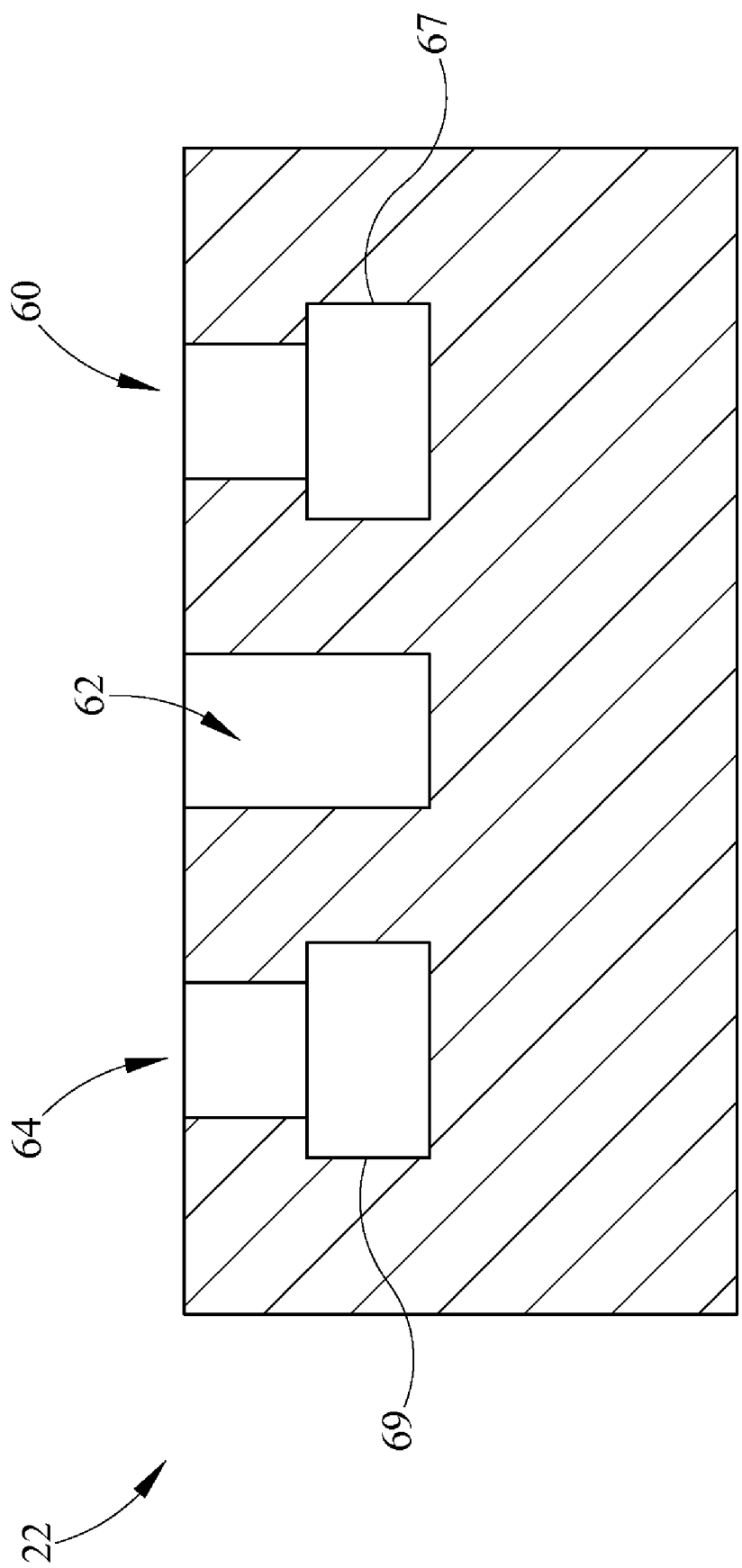
FIG. 8 depicts a side-sectional view of the rail of FIG. 6.
Figure 9:
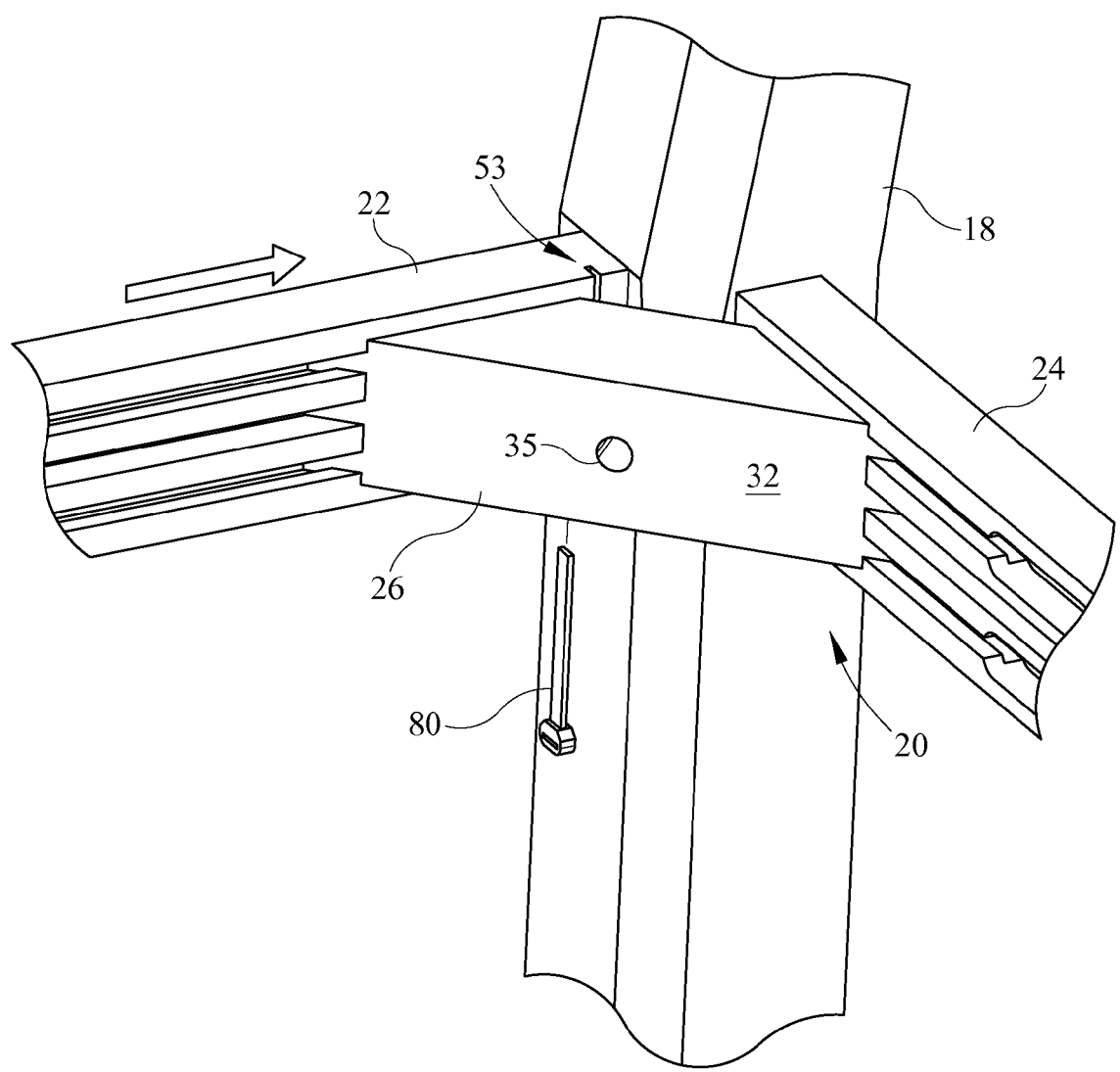
FIG. 9 depicts a perspective view of furniture joinery at one corner of a furniture piece.

Referring now to FIGS. 6 and 8, the slide rail 22 is shown in perspective view and in a side-sectional view, respectively. The slide rail 22, which is depicted in the front and sides of the chair 10 in FIG. 1, comprises grooves 60,62,64. As depicted, the upper and lower grooves 60, 64 are substantially T-shaped in cross-section while the middle groove 62 is not. The grooves 60,62,64 extend from a first end 50 to a second end 52 of the slide rail 22. The first end 50 and second end 52 also comprise keys 28 which engage keyways in adjacent furniture components, such as the exemplary chair legs and table legs. The keys 28 are generally shown as rectangular with rounded corners, however, the keys 28 may vary in shape and should correspond to allow fitting with the adjacent keyways. Accordingly, the slide block 26 may be connected to the slide rail 22 by engagement of the grooves 60,62,64 and slides 40,42,44 at either end 50,52. With this configuration, the slide block 26 is captured in the slide rail 22 due to the corresponding shapes of the slides 40, 42, 44. As seen in FIG. 8, beneath the grooves 60, 64 are undercut rectangular channels 67,69, respectively. The T-shaped slides 40,44 (FIG. 5) are sized to fit with the grooves 60, 64. The channels 67,69 receive the heads 43,47 of the slide block 26. The heads 43,47 are sized wider than the grooves 60,64 so as to engage complimentary opposed flat surfaces between the undercut channels 67,69 and the grooves 60,64. Accordingly, the narrowed portions of the grooves 60, 64 capture the heads 43,47 of the slides 40,44, respectively and the slide blocks 26 may not be removed with a force perpendicular to the longitudinal axis of the rail 22. Instead, the block 26 must be slidably positioned at either end 50,52 of the rail 22 for removal, or insertion. One skilled in the art should realize that the slide rail 22 may be utilized with a table, such as that shown in FIG. 2, by merely varying the length of the rail to compensate for a table.

The first end 50 and second end 52 of the slide rail 22 each comprise a slot 51, 53, respectively. As oriented in FIG. 6, the slots 51,53 are vertically positioned and transverse to the grooves 60,62,64. The slots 51, 53 are sized to each receive a plastic insert against which the slide blocks 26 can engage to pull the slide rail 22 toward a leg 16,18 during construction as described further herein. The slots 51,53 may extend through upper and lower surfaces of the rail 22 as depicted or may extend through at least a single surface allowing insertion though the slide rail 22. Alternatively, it is within the scope of the present invention that the slot be positioned across the grooves 60,62,64 but not extending through the upper or lower surfaces of the rail 22. When an insert 80 (FIG. 3) is engaged by the slide block 26, the rail 22 is pulled toward the adjacent furniture component to which the slide block 26 is being tightened. The inserts 80 may be formed of various materials but the exemplary embodiment utilizes a plastic material, so that if the parts are over-tightened, as described further herein, the plastic will absorb some of that force. This structure also increases the rigidity of the furniture piece, for example chair 10.

Figure 7:
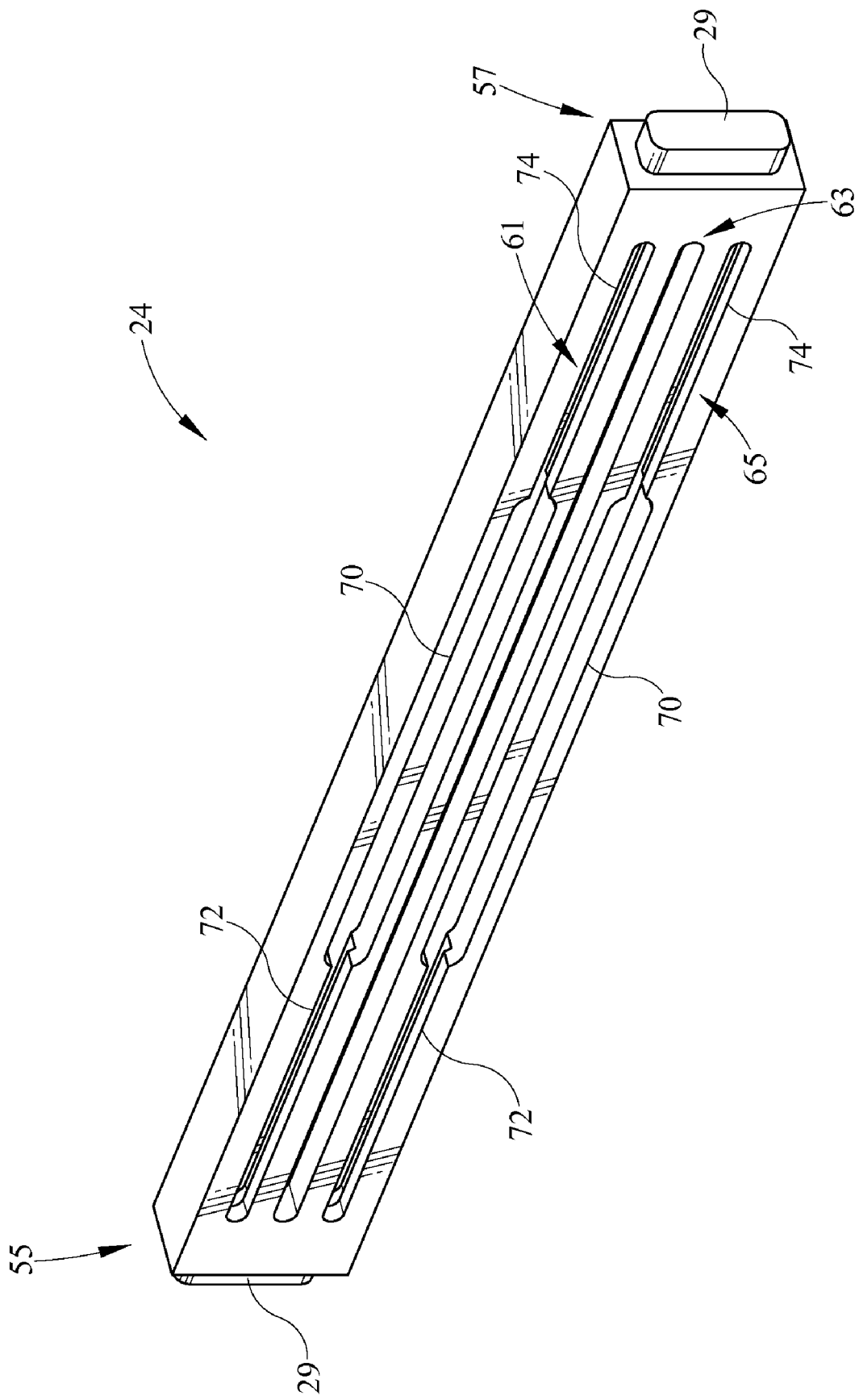
FIG. 7 depicts a perspective view of an alternative slide rail.

Referring now to FIG. 7, an alternative slide rail 24 is depicted in perspective view. One skilled in the art should understand that the rear slide rail 24 may also be utilized in the table of FIG. 2 except that the rail 24 may need to be lengthened to accommodate the table dimensions. It should be understood that the slide rail 22 may be substituted for the rear slide rail 24, and vice-versa, if so desired according to an alternative embodiment. Like the slide rail 22, the rear slide rail 24 is generally rectangular in shape having a first end 55 and a second end 57. In addition to the cross-sectional shape, the rails 22,24 may have some curvature rather than being completely straight, as depicted. Each of the first and second ends 55, 57 comprise keys 29 which may vary in shape, as previously described. The keys 29 mate with keyways 27 in the rear legs 18. Extending longitudinally between the first and second ends 55, 57 are a plurality of grooves 61, 63, 65 corresponding to slides 40, 42, 44, respectively. Unlike rail 22, the grooves 61,63,65 do not extend through the ends of the rail 24. Therefore the slide block 26 cannot be slidably positioned from the ends 55,57 of the slide rail 24. The upper and lower grooves 61, 65 comprise a widened central portion 70 and narrow distal ends 72,74. The central portion 70 has a vertical dimension which is greater than or equal to the vertical thickness of the upper and lower heads 43,47. This widened portion 70 is dimensioned to received the slides 40,44 of slide block 26 so that the slide blocks 26 and rail 24 can be engaged. Within the narrow distal ends 72,74 of the rail 24, the cross-section of the rail 24 is generally similar to rail 22. As the slide blocks 26 are moved longitudinally relative to the slide rail 24, the heads 43, 47 move into the narrow portions 72, 74 of the channels 60, 64. The narrow portions 72,74 are sized to be more narrow than the heads 43,47 but wide enough to receive the necks 41,45. Accordingly, the slide blocks 26 are captured within these channels 60,64 and cannot be removed from the slide rail 22 unless the slide block 26 is moved into the central portion 70 of the channels 60, 64 for removal. Like the slide rail 22, when the slide block 26 is positioned into the slide rail 24, the central slide 42 is located in the central groove or channel 62 for longitudinal movement therein.

Figure 14:
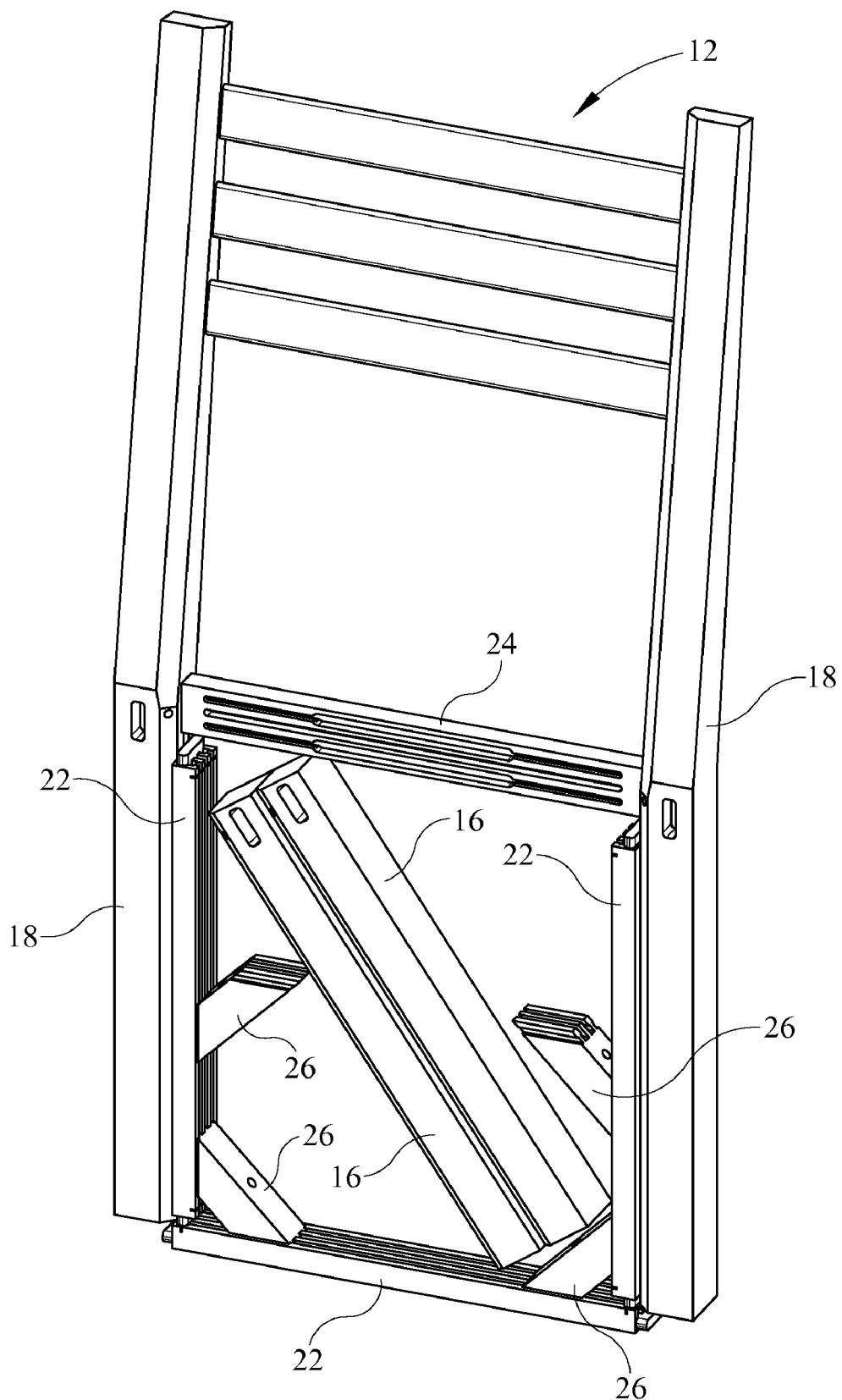

It should be understood that the above described structure of rear legs 18 and seat back 12 may be manufactured and sent to an assembly location in an already constructed condition. Some of the elements of the chair 10 may be partially assembled and located in a nested configuration between the legs 18. This minimizes volume involved in shipping. For example, as depicted in FIG. 14, a nested configuration is shown in perspective view to provide a low profile arrangement for shipping. The rear leg 18 are shown connected by the chair back 12 and the rear slide rail 24. Positioned parallel to the rear legs 18 are slide rails 22. One additional slide rail 22 is positioned at the bottom ends of the rear legs 18 extending from one leg 18 toward the opposite leg 18. Each of the parallel slide rails 22 is oriented with the grooves facing inwardly. Likewise, the lower slide rail 22 is also oriented with the grooves facing inwardly. In this configuration, the slide blocks 26 may be used to hold the rails 22 together. As shown, the two lower slide blocks 26 connect the three slide rails 22. The front legs 16 may also be positioned between the rear legs 18 diagonally therebetween. One skilled in the art can see that the partially assembled components of FIG. 14 can be placed in a box having a height dimension generally which is equal to the thickness of the rails 22 and legs 18. Therefore less volume is necessary of the packaging which decreases shipping costs.

Figure 10:
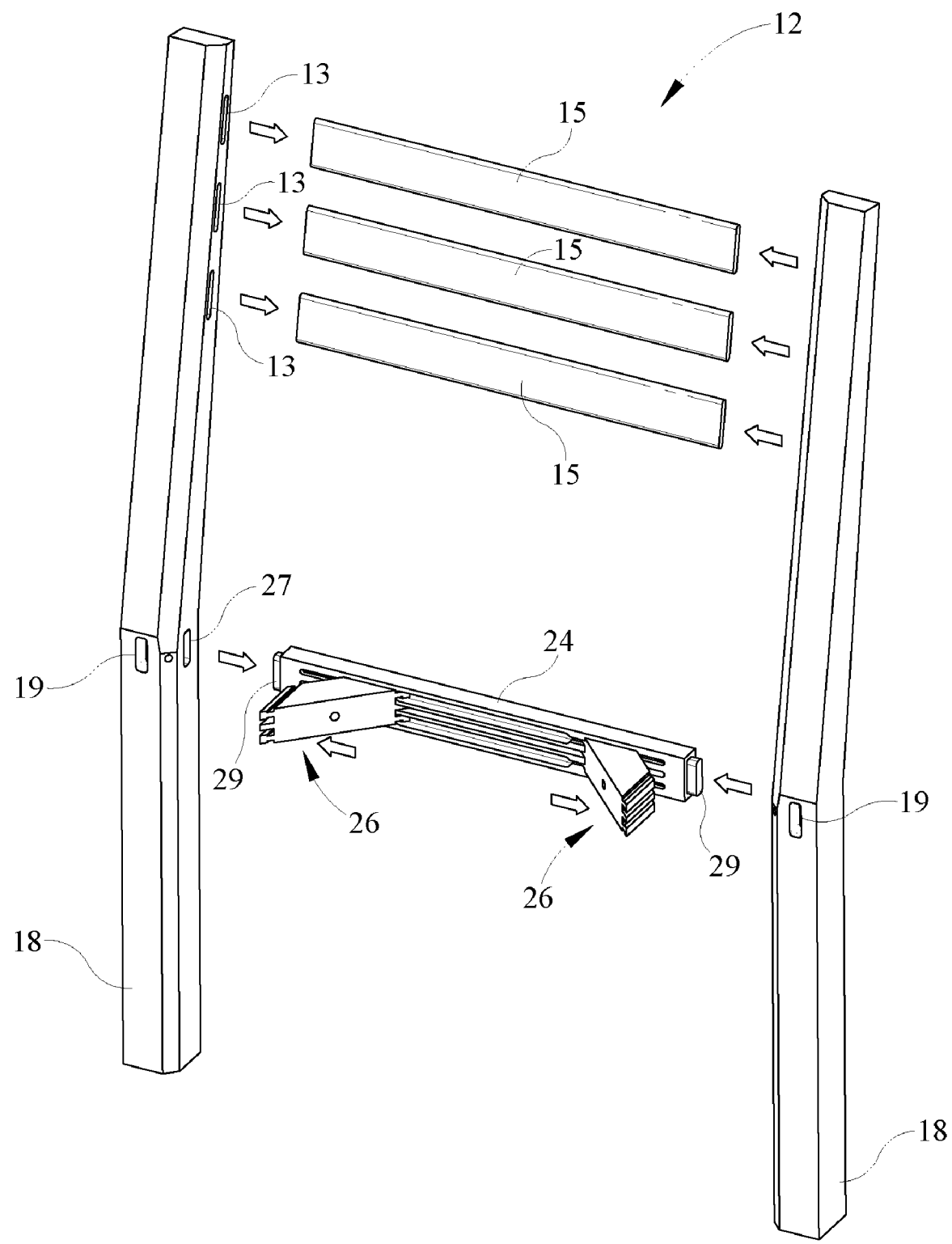
FIGS. 10-13 depict perspective sequence views of the construction of the exemplary chair of FIG. 1; and, FIG. 14 depicts a perspective view of the furniture joinery partially assembled and arranged for shipping.
Figure 11:
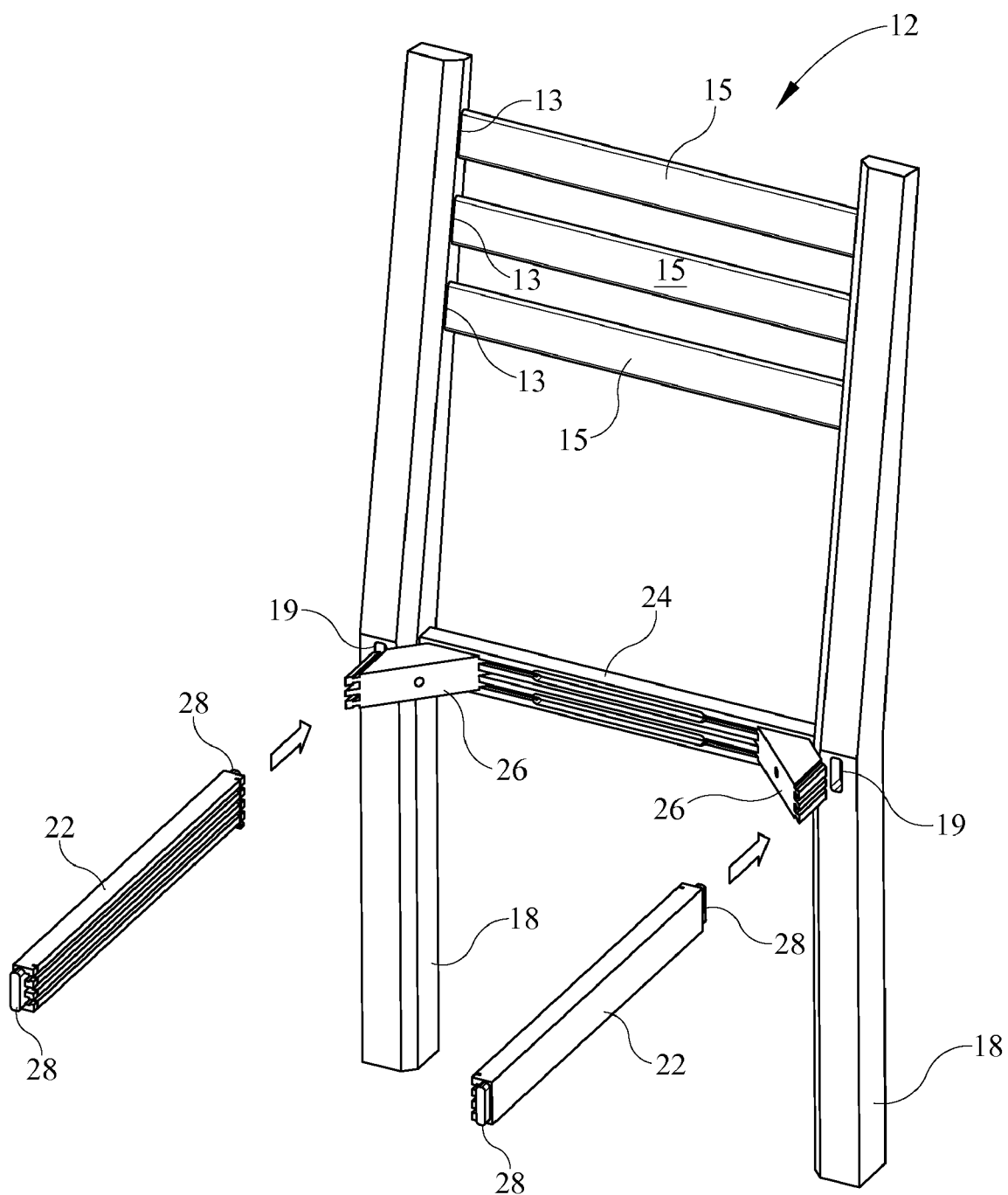

Referring now to FIGS. 9-13, the construction of the joinery 20 is described. Initially, the slide block 26 is connected to the slide rail by inserting the slide block 26 into the grooves 60, 62, 64 at the widened central portion 70 of the slide rail 24. Referring now to FIG. 10 a perspective view of an unassembled chair 10 is shown. The slide blocks 26 are positioned within the central portion of the grooves of the slide rail 24 and arrows indicate their sliding motion outwardly towards the ends of the rail 24. The rear legs 18 are depicted opposing one another for construction of the chair back 12. The slats 15 are disposed between the opposed apertures 13 and the rear legs are moved together to capture the slats therein. One skilled in the art will realize that wood glue or other known fixatives may be utilized to retain the slats 15 between the rear legs 18 during construction. In addition, the rear slide rail 24 is disposed between opposed keyways 27. The slide rail 24 is positioned at a level equal to the keyways 27, the rear legs are moved together so that the seatback 12 is formed and so that the keys 29 are received by the keyways 27 of the rear legs 18. Referring now to FIG. 11, the slide rails 22 are shown moving into position with the rear legs 18 so that the keys 28 will engage the keyways 19. In moving the slide rail 28 toward the rear leg 18, the importance of the slide rail having the grooves cut from end to end is illustrated. In this construction, the slide rails 22 may engage the slide block 26 as the slide rail 22 moves into engagement with the rear legs 18.

Figure 12:
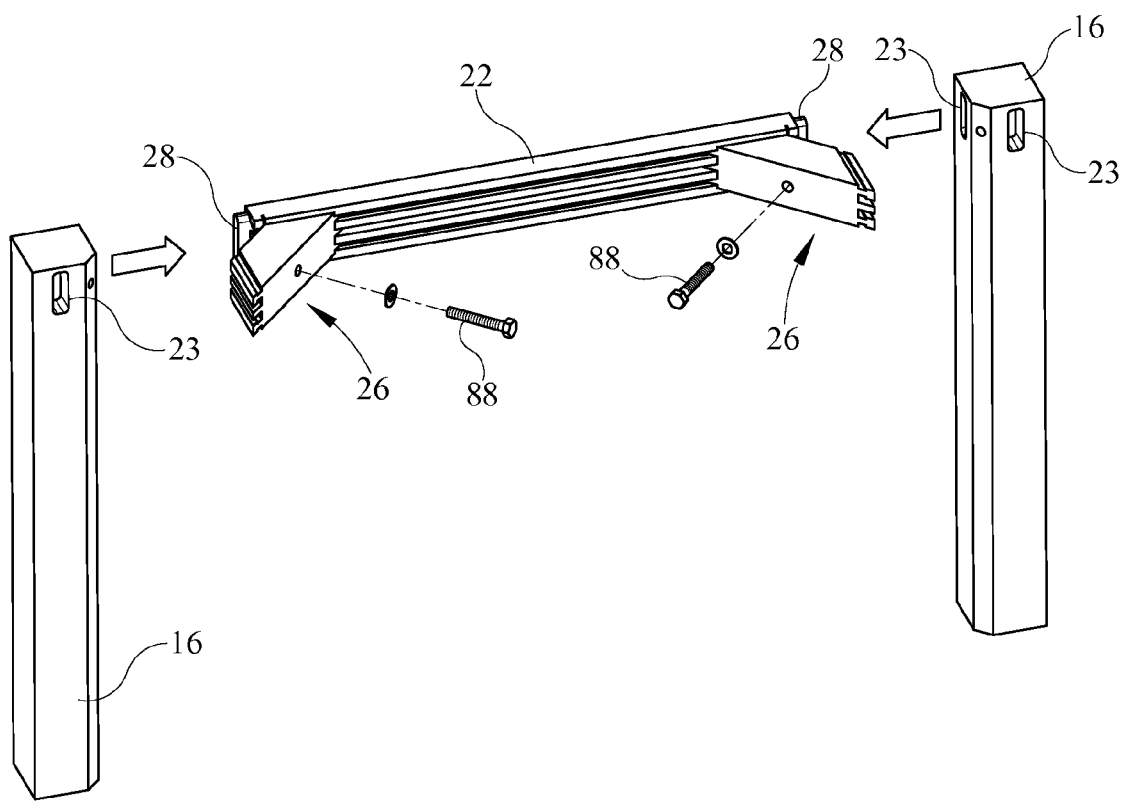

Referring to FIG. 12 the front legs 16 and the slide rail 22. The legs 16 are moved toward the front slide rail 22 so that the keyways 23 engage the keys 28 disposed at the ends of the slide rail 22. The slide blocks 26 are shown engaging the slide rail 22 prior to engagement of the slide rail 22 with the legs 16. The slide blocks 26 are moved toward the ends of the rail 22 adjacent the legs 16 for assembly with the remaining chair assembly. This subassembly may be loosely assembled and held together with wood glue for attachment to the remainder of the chair 10 assembly. The assembly should be completed as described further herein before the glue hardens.

Figure 13:
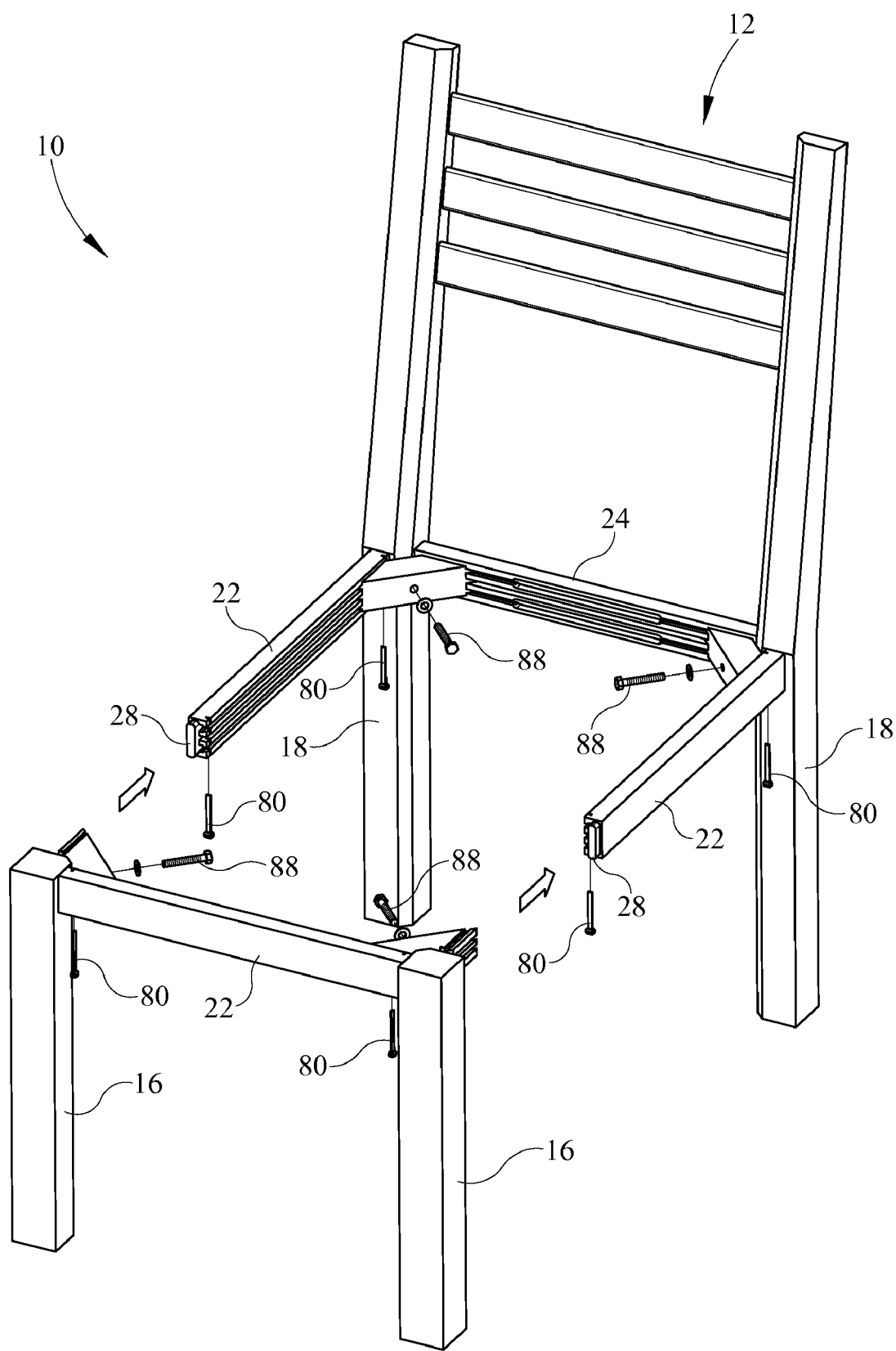

Referring now to FIG. 13 the front legs 16 and front slide rail 22 are shown assembled and arrows indicate movement of that subassembly toward the side slide rails 22. The front slide blocks 26 are positioned outwardly towards the front legs 16 for engagement with the slide rails 22 as the assemblies are moved together. The keys 28 at the ends of the slide rails 22 will engage the keyways 23 of the front legs 16. After the assembly is put together, inserts 80 are positioned within the side slide rails 22 through slots 51,53. FIG. 13 also depicts the inserts 80 being moved into position within the slide rail 22. Specifically the inserts 80 may be formed of a piece of plastic or other material and are inserted through the slots 51,53 (FIG. 6) of the slide rail 22. Once the inserts 80 are positioned at the rear legs 18 and front legs 16 within the side slide rails 22, fasteners 88 are inserted through apertures 35 of the slide blocks 26. As the fasteners 88 are tightened into the front legs 16 and rear legs 18, the slides of the blocks 26 will engage the inserts 80 near the corners of the chair 10. Such engagement in combination with the fasteners 88 being tightened pulls the legs 16, 18 and the corner joineries 20 together to tighten the structure.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A furniture joinery, comprising:

a slide rail having a longitudinal axis and a plurality of grooves extending substantially parallel to said longitudinal axis;

at least one substantially trapezoidal-shaped slide block having a short surface and a long surface parallel to said short surface, said slide block slidably disposed in said slide rail for movement substantially along said longitudinal axis only;

said slide block having a plurality of slides engaging said slide rail, at least one of said plurality of slides having a substantially T-shaped cross-section, said slides having a leading surface extending from said short surface at an angle to said longitudinal axis; and, said substantially T-shaped cross-section having a neck and a head, said grooves receiving said neck therein and said head inhibiting removal of said slide block by a force perpendicular to a slide motion along said slide rail;

a slot extending through said slide rail and receiving an insert, said insert engaged by at least one of said leading surfaces of said plurality of slides.

2. The furniture joinery of claim 1, said slide block having said plurality of slides comprising an upper slide and a lower slide.

3. The furniture joinery of claim 2, said upper slide and said lower slide each having said neck and said head.

4. The furniture joinery of claim 1, said slide rail further comprising an undercut channel disposed beneath at least one of said plurality of grooves.

5. The furniture joinery of claim 4, said undercut channel disposed beneath two of said grooves.

6. The furniture joinery of claim 4, said undercut channel receiving said head.

7. The furniture joinery of claim 4, said plurality of grooves and said undercut channels in combination forming a substantially T-shaped cross-section.

8. The furniture joinery of claim 1, further comprising at least one fastener aperture extending through said slide block.

9. The furniture joinery of claim 1, a first fastener aperture extending through said slide block and a second fastener aperture extending through said slide block in an orientation substantially perpendicular to said first fastener aperture.

10. A furniture joinery assembly, comprising:

a slide rail having a plurality of longitudinally extending grooves along a surface of said slide rail;

at least one substantially trapezoidal-shaped slide block slidably disposed in said slide rail for movement in a substantially longitudinal direction only, said slide block having a short surface and a long surface substantially parallel to said short surface;

said slide block having a plurality of slides for engaging said slide rail, said slides having a leading surface extending coplanar with said short surface;

at least one of said plurality of slides having a neck and a head having a dimension greater than a dimension of said neck, at least one of said grooves receiving said neck therein;

a slot extending perpendicularly to said longitudinal direction and through said plurality of grooves near ends of said slide rail; and, an insert positioned within said slot and engaged by said leading surfaces of said plurality of slides.

11. The furniture joinery of claim 10, said plurality of grooves extending from a first end to a second end of said slide rail.

12. The furniture joinery of claim 10, said grooves further comprising an undercut channel.

13. The furniture joinery of claim 12 wherein said grooves and said undercut channel define a substantially T-shaped cross-section.

* * * * *